United States Patent [19]

Cummings

[11] Patent Number: 4,465,250

[45] Date of Patent: Aug. 14, 1984

[54] WINDBLAST LEG PROTECTOR ASSEMBLY

[75] Inventor: Robert J. Cummings, Hermosa Beach, Calif.

[73] Assignee: The United States of America as represented by the Secretary of the Air Force, Washington, D.C.

[21] Appl. No.: 465,230

[22] Filed: Feb. 9, 1983

[51] Int. Cl.³ ............................................. B64D 25/06
[52] U.S. Cl. ............................... 244/122 AG; 297/466; 128/134; 280/801
[58] Field of Search ................. 244/122, 121; 297/216, 297/466; 128/1 A, 134; 280/801

[56] References Cited

U.S. PATENT DOCUMENTS

| | | | |
|---|---|---|---|
| 2,528,532 | 11/1950 | Martin | 244/122 |
| 2,971,730 | 2/1961 | Martin | 244/122 AG |
| 3,074,669 | 1/1963 | Bohlin | 244/122 AG |
| 3,218,103 | 11/1965 | Boyce | 244/122 AG |
| 3,249,385 | 5/1966 | Boyce et al. | 297/384 |
| 3,302,633 | 2/1967 | Vykukal | 244/122 B |
| 3,329,464 | 7/1967 | Barwood et al. | 244/122 B |
| 3,502,073 | 3/1970 | Stanley | 128/134 |
| 4,359,200 | 11/1982 | Brevard et al. | 244/122 AG |

FOREIGN PATENT DOCUMENTS 1099490 1/1968 United Kingdom ............ 244/122 R

*Primary Examiner*—Galen L. Barefoot
*Attorney, Agent, or Firm*—Donald J. Singer; Jacob N. Erlich

[57] ABSTRACT

A windblast leg protector assembly for use by an occupant of an open-type ejection seat of an aircraft. The assembly includes, for each leg of the seat occupant, a modification to the occupant's conventional anti-acceleration suit by way of a piece of nylon fabric (with concave configurated load spreading cuts, and with a ring captured thereon) attached to the thigh portion, and a similar piece of nylon fabric with a ring captured thereon attached to the calf portion, of each full length leg member of the anti-acceleration suit. Restraining-/retracting straps which are connected to, and which remain with the ejection seat, are also constituent components of the windblast leg protector assembly. Snap hooks, which are captured on the slack restraining/retracting straps, are releasably connected by the occupant, after sitting down in the ejection seat, to the captured rings on the thigh and the calf portions of the anti-acceleration suit being worn. During ejection, the slack restraining/retracting straps are automatically retracted and tensioned, thereby pulling downwardly on the captured rings, their retaining members, the leg members of the suit, and the legs of the occupant. As a result, the legs of the occupant are restrained, and thereby are prevented from being extended into the windblast. Although the thighs of the occupant are downwardly restrained during ejection, the calves of the seated occupant's legs move upwardly to relieve any tension load in the occupant's knees.

8 Claims, 3 Drawing Figures

WINDBLAST LEG PROTECTOR ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a leg restraint and, more particularly, to a novel assembly for protecting the legs of an occupant of an open-type ejection seat in an aircraft, when the occupant and the seat are ejected together from the aircraft into the surrounding airstream, i.e., an assembly for preventing injury due to windblast to the legs of the ejection seat occupant.

When an ejection seat and its occupant are ejected from an aircraft together, particularly at high speeds, the occupant is subjected to great pressure from the windblast. This situation is particularly dangerous if the occupant's limbs are caught in the windblast, because severe injury can result to the limbs. More specifically, and with regard to the occupant's legs during ejection and assuming that the ejection seat is stable, the aerodynamic pressure of the windblast bends the lower legs under the seat and lifts the upper legs. With the lower leg trapped under the seat pan, the lift forces on the upper leg must be carried by the knee joint as tension loads. Such tension loads are increased by drag forces acting on the feet and by the uncounterbalanced inertial response loads on the upper part of the lower leg. The inertial load is caused by the front panel of the seat bucket which traps the stagnated air behind the legs, and thereby cancels the action of the aerodynamic pressure on the front of the legs.

However, although ejection seat stability has been assumed, attitude instability (weakness or absence of tendency to align with the flight) of open-type ejection seats is well documented. A consequence of attitude instability is that aerodynamic forces may act on the legs over a wide range of angles-of-attack.

Accordingly, windblast safety protection for the legs requires: that the knees be relieved of the aerodynamic pressure induced tension loads which they bear during ejection; and that support for the legs against aerodynamic forces be available over a wide range of angles-of-attack. In addition, the windblast safety protection for the legs must be acceptable to the intended users, e.g., aircrew members, especially pilots. In turn, acceptance depends upon ease in donning and doffing, unencumberence to the user, lightness in weight, and undetectability while in use.

SUMMARY OF THE INVENTION

The instant invention meets the foregoing requirements, i.e., safety protection, and user acceptance.

According to the instant invention, a windblast leg protector assembly for use by the occupant of the ejection seat is provided which includes a leg restraining means (for each leg) and a means (for each leg) for releasably securing the leg restraining means to the ejection seat. In addition, a lower leg support assembly for preventing the lower legs from being bent backwards under the seat pan by the action of the wind blast is provided which includes a means for permitting a kneeward movement of the lower leg simultaneously with provision of support against a backward movement at the lower leg under the sean pan. It is here to be noted that one portion of the leg restraining means is borne by the user, and thereby promotes user acceptance, in addition to functioning as a leg restraint. That portion of the leg restraining means includes modifications to each full length leg member of the anti-acceleration suit at the thigh and at the calf portions of the suit. The suit, as an item of custom tailored personal equipment, is donned by the intended occupier of the ejection seat before getting into the aircraft and occupying the seat. The other portion of the leg restraining means is a leg restraining/retracting strap member (for each leg) which is releasably connected to the anti-acceleration suit modifications with snap hooks. The occupier connects the the snap hooks immediately after occupying the seat and disconnects them just prior to exiting the seat under normal conditions. The means for releasably securing the leg restraining means to the ejection seat include a means for automatically retracting and holding the leg restraining/retracting strap member, with one end of the strap member releasably connected to the ejection seat and with the other end of the strap member captured by a no-return holding device connected to the seat and, in turn, with said strap member releasably connected to the aircraft cockpit floor. The leg restraining/retracting strap members are thereby integrated with the ejection seat and "stay" with the ejection seat.

During ejection of the ejection seat and of the occupant therein together from the aircraft, the full length leg members of the anti-acceleration suit (with the occupant's legs therein) are pulled downwardly by the retracting means, by the leg restraining/retracting strap members connected to the retracting means, and by the modifications to the anti-acceleration suit which are connected to the leg restraining/retracting strap members. This downwardly pulling thereby restrains the legs from being extended into the windblast during ejection. In addition, this downwardly pulling results in the downwardly restraint of the thigh portion modifications of the leg members of the suit and, of course, of the thighs of the seat occupant. Further, this downwardly pulling nevertheless permits the upward movement of the calf portion modifications of the leg members of the suit and, of course, of the calves of the seat occupant. In turn, this upward movement of the calves relieves any tension load in the seat occupants knees; and, thereby, support and protection to the legs are provided against windblast forces during ejection.

Therefore, it is an object of the instant invention to Provide a windblast leg protecting apparatus which will prevent the legs of the occupant of the aircraft ejection seat from being extended into the windblast during ejection.

Another object of this invention is to provide a windblast leg protecting apparatus which will downwardly restrain the seat occupant's legs during ejection, while nevertheless permitting the calves of the legs to move upwardly to relieve any tension load in the occupant's knees.

Still another object of the instant invention is to provide a windblast leg protecting apparatus which is readily acceptable to airflight crews, especially pilots, because of its ease in donning and doffing, in engaging and disengaging, its unencumberence to the user, its lightness in weight, and its undetectability while in use.

Yet another object of this invention is to provide a windblast leg protecting apparatus which, in part, is a modification to the anti-acceleration suit that is the personal equipment of the aircrew member, that is normally worn by the aircrew member, and that is donned and doffed by the user prior to getting into the aircraft and occupying the ejection seat.

A further object of the instant invention is to provide a windblast leg protecting apparatus which, in part, is a leg restraining/retracting strap member (for each leg) that is releasably connectable easily and quickly to the modification on the anti-acceleration suit, that retracts during ejection, that restrains the seat occupant's legs from being extended into the windblast, and that remains with the ejection seat.

These objects of the instant invention, as well as other objects related thereto (e.g., simple in structure, economical to manufacture, and reliable in use), will become readily apparent after a consideration of the description of the instant invention, together with reference to the contents of the Figures of the drawing.

DESCRIPTION OF THE PREFERRED EMBODIMENT

Figure 1:
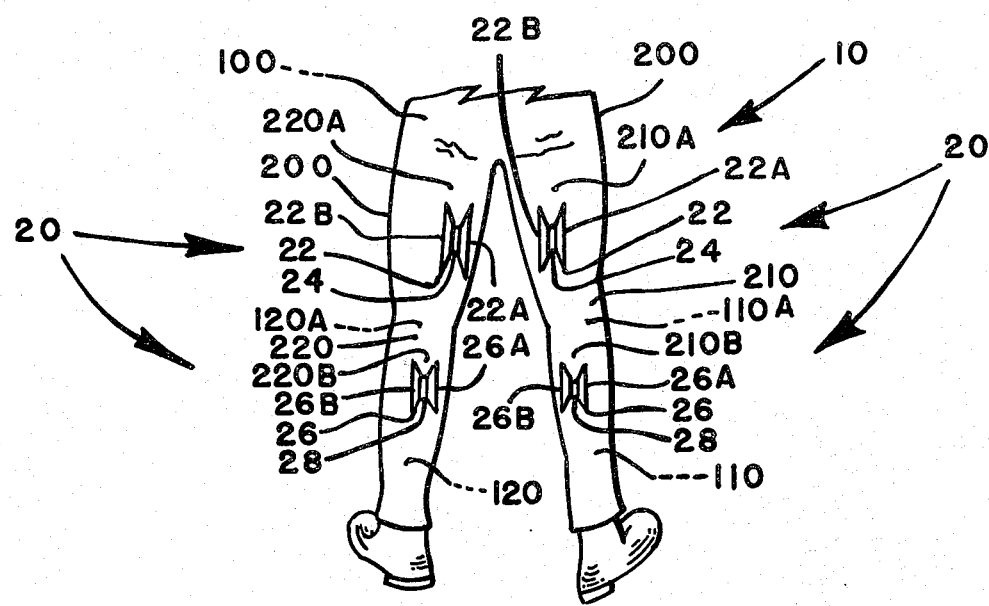
FIG. 1 is the back view, in simplified pictorial and schematic form, and partially fragmented, of an aircrew member wearing an anti-acceleration suit that incorporates a modification thereto which comprises a major constituent portion of the instant invention, i.e., a windblast leg protecting assembly.
Figure 2:
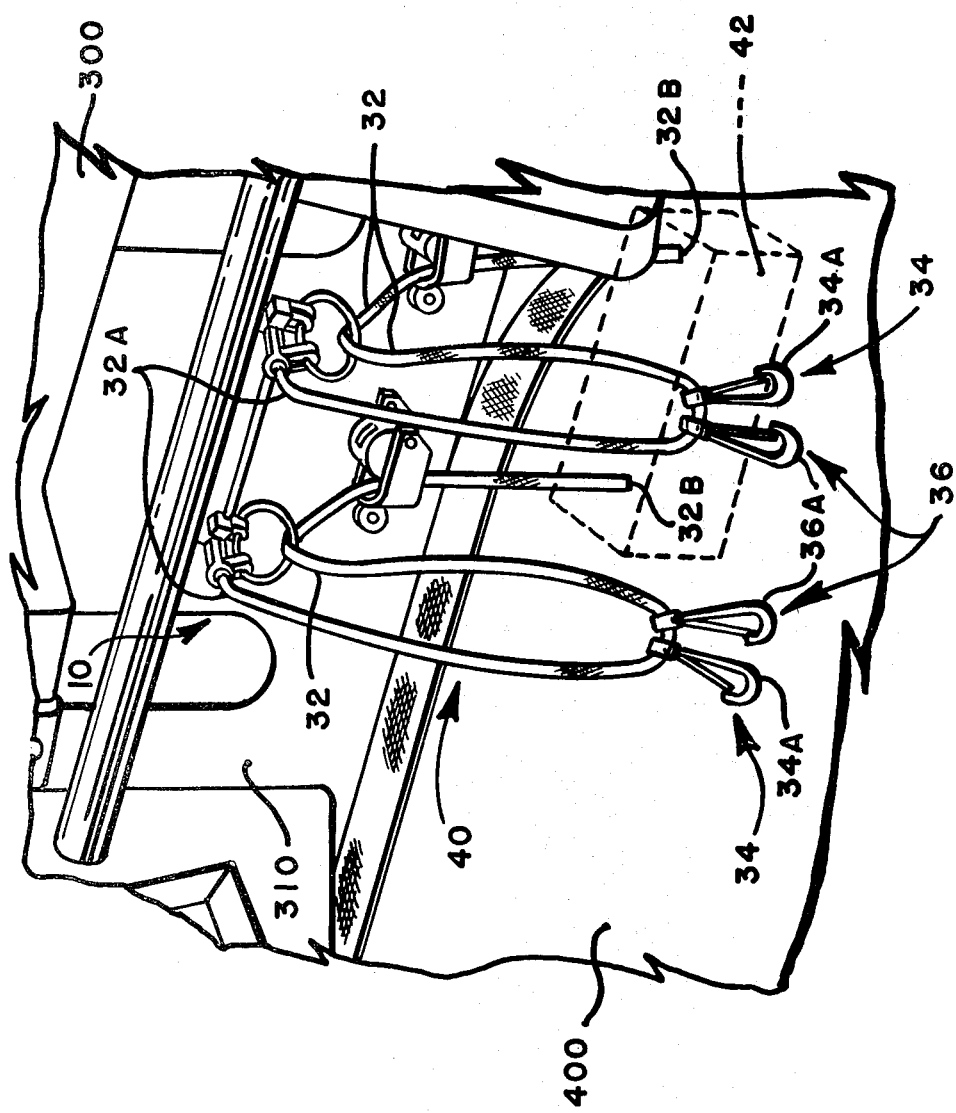
FIG. 2 is a perspective view, in simplified pictorial and schematic form, and partially fragmented, of the other major constituent portion of the instant invention, with this portion connected to the lower front center panel of the ejection seat in the aircraft.
Figure 3:
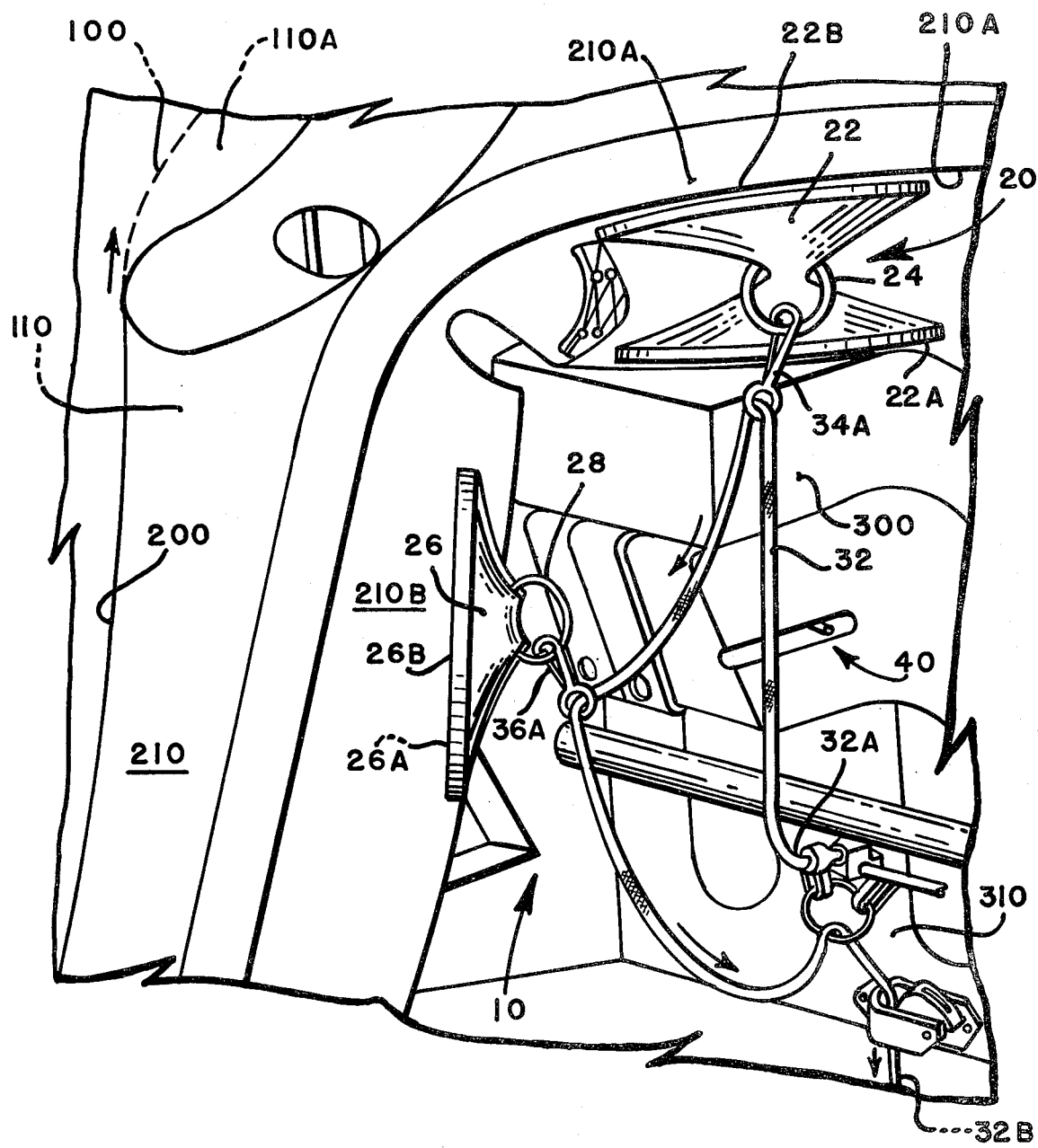
FIG. 3 is a perspective view in simplified pictorial and schematic form, and partially fragmented, of a representative leg of the aircrew member shown in FIG. 1, while the aircrew member is in the aircraft occupying the ejection seat, with the leg hooked up and ready for windblast projection if the seat and the occupant are ejected from the aircraft.

With reference to FIGS. 1-3, inclusive, the preferred embodiment 10 of the instant invention, in its most basic and generic form, comprises: (a) means (generally designated 20, FIGS. 1 and 3) for each leg (such as 110, FIGS. 1 and 3, and 120, FIG. 1) of the occupant 100 (FIGS. 1 and 3) of an open ejection seat (such as 300, FIGS. 2 and 3) of an aircraft (such as 400, FIGS. 2 and 3), for restraining the leg 110 and 120 during ejection of the seat 300 and of the occupant 100 together from the aircraft 400, where the means 20 includes an anti-acceleration suit (such as 200, FIGS. 1 and 3) which is worn by the occupant 100 of the ejection seat 300, and which has a full leg member (such 210, FIGS. 1 and 3, and 220, FIG. 1) for that leg 110 and 120; and (b) means (generally designated 40, FIGS. 2 and 3), operably connected to the ejection seat 300 and to the anti-acceleration suit 200 full length member 210 and 220 for that leg 110 and 120 of the seat occupant 100, for releasably securing the leg restraining means 20 to the ejection seat 300.

It is here to be noted that each full length leg member 210 and 220 of the anti-acceleration suit 200 has a thigh portion 210A (FIGS. 1 and 3) and 220A (FIG. 1), and a calf portion 210B (FIGS. 1 and 3) and 220B (FIG. 1). It is also to be noted that the occupant's knees (such as 110A, FIGS. 1 and 3, and 120C, FIG. 1) are not covered by the conventional anti-acceleration suit 200, as is representatively shown in FIG. 3.

Each leg restraining means 20 for each full length leg member 210 and 220 of the anti-acceleration suit 200, includes: (a) a first retaining member 22 having a first end 22A and a second end 22B attached to the thigh portion 210A and 220A of the full length leg member 210 and 220; (b) a first ring member 24 captured by the first retaining member 22 and movable between the first and second attached ends 22A and 22B of the first retaining member 22; (c) a second retaining member 26 having a first end 26A and a second end 26B attached to the calf portion 210B and 220B of the full length leg member 210 and 220; and (d) a second ring member 28 captured by the second retaining member 26 and movable between the first and second attached ends 26A and 26B of the second retaining member 26.

The first and second ring-retaining members 22 and 26 each comprise an essentially rectangularly shaped piece of fabric, preferably nylon, having a load spreading concave cut on each of the two attached sides that are opposite to each other and that are adjacent to, and intermediate of, the first and second unattached ends of member 22 and 26 (i.e., ends 22A and 22B, and ends 26A and 26B). The concave-cut attached-ends of members 22 and 26 are bent into a straight line before being sewn to leg members 210 and 220. This provides slack fabric along the unattached sides at members 22 and 26 which allows gathering of the fabric through rings 22, 24, 26 and 28. This assembly technique provides both access to the lacing at the backs of members 210 and 220, and maximal use of the load carrying capacity of simple available components like fabric and rings.

As a matter of preference the first and second ring members 24 and 28 are made of metal.

Each leg restraining means 20 further includes: a leg restraining/retracting strap member 32, FIGS. 2 and 3 (hereinafter referred to as a leg restraining strap member or as a strap member) having a first end 32A and a second end 32B, with the ends 32A and 32B connected to and integrated with the ejection seat 300; and, a first releasable hooking means 34 and a second releasable hooking means 36 captured by the strap member 32 and movable between the first and second ends 32A and 32B of the strap member 32, with the first hooking means 34 releasably hooked to the first ring member 24, and with the second hooking means 36 releasably hooked to the second ring member 28, as is shown representatively in FIG. 3. As a matter of preference and not of limitation, each leg restraining strap member 32 is made of a webbing material.

Each releasable hooking means 34 and 36 includes, respectively, a snap hook member, i.e., 34A for 34, and 36A for 36. The snap hook members 34A and 36A are made of metal.

The means 40 for releasably securing the leg restraining means 20 to the ejection seat 300 includes: the first end 32A of the leg restraining strap member 32, with this end 32A releasably connected to the lower front panel portion 310 of the ejection seat 300, as can be seen in FIGS. 2 and 3; means 42 for releasably attaching and retracting attaching and retracting the leg restraining strap member 32, with this means 42 operatively associated with the aricraft cockpit floor 400, as can be seen in FIG. 2; and, the second end 32B of the leg restraining strap member 32, with this end 32B connected to the releasably attaching and retracting means 42.

As a matter of practicality, the occupant 100, FIGS. 1 and 3, is assumed to have two legs 110 and 120, and accordingly is also assumed to be wearing the conventional anti-acceleration suit 200 which has a full length leg member 210 and 220 for each leg 110 and 120. Therefore, the preferred embodiment 10, FIGS. 1-3, inclusive, of the instant invention includes two leg restraining means 20 and two means 40 for releasably securing the two leg restraining means 20 to the ejection seat 300. It is here to be noted that, although it is unlikely that the seat occupant 100 would have only one leg, the preferred embodiment 10 of the invention is useable nevertheless by a one-legged seat occupant.

MANNER OF OPERATION AND OF USE OF THE PREFERRED EMBODIMENT

The manner of operation and of use of the preferred embodiment 10 of the instant invention can be easily ascertained by any person of ordinary skill in the art from the foregoing description, coupled with reference to the contents of the Figures of the drawing.

For others, the following explanation is given. Prior to boarding the aircraft 400, FIG. 2, the prospective occupant 100, FIG. 1, of the ejection seat 300, FIGS. 1 and 3, dons his anti-acceleration suit 200, FIGS. 1 and 3, which is an item of personal equipment. It is to be remembered that the anti-acceleration suit 200 already has been modified by the attachment of retaining members 22 and 26 (with their respective captured ring members 24 and 28) to, respectively, the thigh portion 210A and 220A and the calf portion 210B and 220B, of each full length leg member 210 and 220 of the anti-acceleration suit 200.

After the prospective occupant 100 has boarded the aircraft 400 and has seated himself in the ejection seat 300, the occupant 100 connects snap hook 34A to captured ring member 24 of first retaining member 22, and connects snap hook 36A to captured ring member 28 of second retaining member 26. The occupant 100 is now ready for ejection, if necessary, from the aircraft 400 together with the ejection seat 300.

It is here to be noted that, while in the aircraft 400 and hooked up for ejection (and windblast leg protection during ejection), the occupant 100 can perform any of the movements that he could perform in the aircraft 100 without being hooked up to the windblast leg protector assembly 10.

If ejection from the aircraft 400 becomes necessary, the seat occupant 100 initiates the ejection. When ejection is initiated, the initiation causes the holding and retracting means 42, FIG. 2, to retract (i.e., pull downwardly) each of the two slack restraining straps 32, FIG. 2, thereby tightening and tensioning the straps 32 and pulling downwardly the captive rings 24 and 28 (of the retaining members 22 and 26) and the anti-acceleration suit full length leg member 210 and 220(to which the ring-retaining members 22 and 26 are attached). As a result, the legs 110 and 120 of the seated occupant 100 are pulled downwardly, and are restrained from (and are prevented from) being extended into the windblast during ejection.

It is important to note that the structure and configuration of the ring-retaining members 22 and 26 are such that these members 22 and 26 spread the restraint loads over the widest possible area of the anti-acceleration suit 200.

It is also very important to note that, although the thighs of the occupant 100 are downwardly restrained during ejection, the calves of the occupant's legs 110 and 120 can (and do) move upwardly to relieve any tension load in the occupant's knees 110A and 120A, as is shown in FIG. 3 with regard to representative knee 110A.

CONCLUSION

It is abundantly clear from all of the foregoing, and from the contents of the Figures of the drawing that the stated objects of the instant invention, as well as other objects related thereto, have been achieved.

It is to be noted that, although there have been described and shown the fundamental and unique features of the instant invention, as applied to a preferred embodiment, nevertheless various other embodiments, variations, adaptations, substitutions, additions, and the like may occur to and can be made by those of ordinary skill in the art. For example, the captured rings 24 and 28 can be made of suitable fabric rather than of metal; and, the instant invention can be adapted for use with an accelerating/decelerating sled, rather than being used in an aircraft.

What is claimed is:

1. A windblast leg protector assembly for use by an occupant of an ejection seat of an aircraft, said ejection seat having a lower front center panel portion, and wherein said occupant is wearing an anti-acceleration suit with a full length leg member having a thigh portion and a calf portion for each leg of said occupant, said windblast leg protector assembly comprising:
   a. means, for each leg of said occupant, for restraining said leg during ejection of said seat and of said occupant together from said aircraft wherein said restraining means includes said anti-acceleration suit full length leg member for that leg and further includes
      a first retaining member having a first end and a second end attached to said thigh portion of said full length leg member of said anti-acceleration suit,
      a first ring member captured by said first retaining member and movable between said first and second attached ends of said first retaining member,
      a second retaining member having a first end and a second end attached to a calf portion of said full length leg member of said anti-acceleration suit,
      a second ring member captured by said second retaining member and movable between said first and second attached ends of said second retaining member, a leg restraining strap member having a first end and a second end with said ends connected to and integrated with said ejection seat, and
      a first and a second releasable hooking means captured by said strap member and movable between said first and second ends of said strap member with said first hooking means releasably hooked to said first ring member, and with said second hooking means releasably hooked to said second ring member;
   b. said first and second retaining members each including an essentially rectangular-shaped piece of fabric having a load spreading concave cut between each of said first and second attached ends; and
   c. means, operably connected to said ejection seat and to said anti-acceleration suit full length leg member for that leg, for releasably securing said leg restraining means to said ejection seat, said releasably securing means including said first end of said leg restraining strap member connected to said lower front panel portion of said ejection seat, means for holding and retracting said leg restraining strap member with this means operably associated with said ejection seat, and said second end of said leg restraining strap member connected to said holding and retracting means;

whereby during ejection of said ejection seat and of said occupant thereof together from said aircraft, said full length leg member of said anti-acceleration suit, for each leg of said seat occupant with said occupant's leg therein, is pulled downwardly, thereby restraining said leg from being extended into the windblast during ejection, and whereby the thigh of said occupant's leg is downwardly restrained, while nevertheless the calf of said occupant's leg is permitted to move upwardly to relieve any tension in occupant's knee, thereby providing support and protection to said leg against windblast forces during ejection.

2. A windblast leg protector assembly, as set forth in claim 1, wherein said first releasable hooking means includes a first snap hook member, and wherein said second releasable hooking means includes a second snap hook member.

3. A windblast leg protector assembly, as set forth in claim 2, wherein:
   a. said first and second retaining members are each made of nylon fabric;
   b. said first and second ring members are each made of metal; and
   c. said first and second snap hook members are each made of metal.

4. A windblast leg protector assembly, as set forth in claim 3, wherein said occupant of said ejection seat has two legs and is wearing an anti-acceleration suit with a full length leg member for each of the two legs, and wherein said windblast leg protector assembly includes two leg restraining means and two means for releasably securing the two leg restraining means to said ejection seat.

5. A windblast leg protector system for use in ejecting from an aircraft, comprising:
   a. an open ejection seat having a lower front center panel portion; and
   b. a windblast leg protector assembly for use by an occupant of said open ejection seat wherein said occupant is wearing an anti-acceleration suit with a full length leg member having a thigh portion and a calf portion for each leg of said occupant wherein said assembly includes:
   (1) means, for each leg of said occupant, for restraining said leg during ejection of said seat and of said occupant together from said aircraft wherein said means includes said anti-acceleration suit full length leg member for that leg and further includes a first retaining member having a first end and a second end attached to said thigh portion of said full length leg member of said anti-acceleration suit, a first ring member captured by said first retaining member and movable between said first and second attached ends of said first retaining member, a second retaining member having a first end and a second end attached to a calf portion of said full length leg member of said anti-acceleration suit, a second ring member captured by said second retaining member and movable between said first and second attached ends of said second retaining member, a leg restraining strap member having a first end and a second end with said ends connected to and integrated with said ejection seat, and a first and a second releasable hooking means captured by said strap member and movable between said first and second ends of said strap member with said first hooking means releasably hooked to said first ring member, and with said second hooking means releasably hooked to said second ring member;

(2) said first and second retaining members each including an essentially rectangular-shaped piece of fabric having a load spreading concave cut between each of said first and second attached ends; and (3) means, operably connected to said ejection seat and to said anti-acceleration suit full length leg member for that leg, for releasably securing said leg restraining means to said ejection seat, said releasably securing means including said first end of said leg restraining strap member connected to said lower front panel portion of said ejection seat, means for holding and retracting said leg restraining strap member with this means operably associated with said ejection seat, and said second end of said leg restraining strap member connected to said holding and retracting means;

whereby during ejection of said ejection seat and of said occupant thereof together from said aircraft, said full length leg member of said anti-acceleration suit, for each leg of said seat occupant with said occupant's leg therein, is pulled downwardly, thereby restraining said leg from being extended into the winblast during ejection, and whereby the thigh of said occupant's leg is downwardly restrained, while nevertheless the calf of said occupant's leg is permitted to move upwardly to relieve any tension in occupant's knee, thereby providing support and protection to said leg against windblast forces during ejection.

6. A windblast leg protector system, as set forth in claim 5, wherein said first releasable hooking means includes a first snap hook member, and wherein said second releasable hooking means includes a second snap hook member.

7. A windblast leg protector system, as set forth in claim 6, wherein:
   a. said first and second retaining members are each made of nylon fabric;
   b. said first and second ring members are each made of metal; and
   c. said first and second snap hook members are each made of metal.

8. A windblast leg protector system, as set forth in claim 7, wherein said occupant of said ejection seat has two legs and is wearing an anti-acceleration suit with a full length leg member for each of the two legs, and wherein said windblast leg protector assembly includes two restraining means and two means for releasably securing the two leg restraining means to said ejection seat.

* * * * *